United States Patent [19]

Dittrich et al.

[11] 4,254,009

[45] Mar. 3, 1981

[54] BINDING AGENT FOR COATING COMPOSITIONS HAVING A LONG SHELF LIFE

[75] Inventors: Werner Dittrich, Rheinfelden-Herten; Heinz Nestler, Troisdorf-Eschmar; Friedhelm Schnippering, Siegburg-Braschoss, all of Fed. Rep. of Germany

[73] Assignee: Dynamit Nobel Aktiengesellschaft, Troisdorf, Fed. Rep. of Germany

[21] Appl. No.: 851,572

[22] Filed: Nov. 14, 1977

[30] Foreign Application Priority Data

Nov. 27, 1976 [DE] Fed. Rep. of Germany ....... 2654036

[51] Int. Cl.$^3$ .............................................. C08L 67/00
[52] U.S. Cl. ................................. 260/40 R; 106/1.17; 106/287.16; 260/37 M; 260/42.26; 525/474; 525/479
[58] Field of Search ............ 260/824 R, 37 M, 42.26, 260/827, 40 R; 525/446; 106/1.17, 287.16

[56] References Cited

U.S. PATENT DOCUMENTS

| | | | |
|---|---|---|---|
| 3,450,792 | 6/1969 | Sekmakas | 260/42.26 X |
| 3,476,827 | 11/1969 | Engelhardt | 260/42.26 X |
| 3,488,319 | 1/1970 | Miller | 260/824 R X |
| 3,577,262 | 5/1971 | Nordstrom | 260/42.26 X |
| 3,577,264 | 5/1971 | Nordstrom | 260/42.26 X |
| 3,637,550 | 1/1972 | Sprauer | 260/824 R X |
| 3,644,245 | 2/1972 | Flanogan et al. | 260/824 R X |
| 3,971,756 | 7/1976 | Bialous et al. | 260/824 R |
| 4,043,953 | 8/1977 | Chang et al. | 260/827 X |
| 4,093,673 | 6/1978 | Chang et al. | 260/827 X |

*Primary Examiner*—Lewis T. Jacobs
*Attorney, Agent, or Firm*—Sprung, Felfe, Horn, Lynch & Kramer

[57] ABSTRACT

A binder for a pigmentous composition containing a silicic acid ester which in turn contains at least one alkoxyalkyl group, a pigmentous composition, especially a zinc dust paint, comprising said binding agent and a paint composition comprising said binding agent and a resin preferably further containing a pigment.

26 Claims, No Drawings

BINDING AGENT FOR COATING COMPOSITIONS HAVING A LONG SHELF LIFE

BACKGROUND OF THE INVENTION

1. Field of the Invention

This invention relates to a binding agent for a pigmentous or resinous composition. More especially this invention relates to a binder composition containing a silicic acid ester, solvent and hardener. This invention is particularly directed to a binder for a pigmentous composition especially a zinc dust paint which does not harden prematurely in a storage vessel and yet dries upon application to a surface within a short period thereafter to provide an anticorrosive coating on a metal such as iron and steel having good hardness qualities. This invention is particularly directed to such a paint composition which fully hardens within about 24 hours. The paints of the present invention are compatible with organic resins.

2. Discussion of The Prior Art

Coating compositions have been described which are based upon organic silicates and zinc dust. Ethyl silicate is named in British Pat. No. 652,136 as organic silicate. It is in the unhydrolyzed state. The coating compositions prepared therefrom by mixing it with solvents, zinc dust and amines as hardeners have a good shelf life, but they take too long to set. The setting time is 4 to 5 hours and is unacceptable in practice. Furthermore, these coating compositions have the disadvantage that they tend to check in coatings more than 50 microns thick.

For the partial removal of these disadvantages, it is proposed in German Pat. No. 12 98 221 to use the ethyl silicate in the hydrolyzed state and use the hydrolyzed solutions together with solutions of polyvinyl butyral resins as binding agents. In this procedure, however, after zinc dust has been incorporated as pigment, the coating composition solidifies within 24 hours. If this system is used, therefore, the zinc dust and the binding agent must be stored separately. This separate storage is a disadvantage for practical application with regard to stocking and with regard to the need to use a mixture immediately after preparation.

The problem has therefore existed of finding a binding agent which, when mixed with zinc dust, will have a very long shelf life in the closed container, but when applied to the substrate will have a very short drying time. Furthermore, the paint prepared therewith must assure ease of use and good adhesion to the substrate, i.e., the pigment must not settle hard in the bottom of the container, and it must be easy to stir up. The paint must be easy to apply by spraying or brushing in a known manner.

SUMMARY OF THE INVENTION

In accordance with this invention there is provided a binder composition having an exceptionally long shelf life in a closed container which dries in a relatively short period of time after application to a substrate. The binder composition on which the paints are based comprises a silicic acid ester containing at least one alkoxyalkyl group. Binders of the invention therefore comprise the silicic acid ester containing the alkoxyalkyl group, solvent and a hardener therefore. The silicic acid ester is preferably in an unhydrolized state.

A binding agent for coating compositions has been mentioned in German Pat. No. 20 00 199, which contains an ethyl silicate having the composition $Si_5O_4(OR^1)_9(OR^2)_3$ wherein $R^1$ represents a $C_2H_5$ moiety and $R^2$ a $CH_3—CH_2—O—CH_2$ moiety. This ethyl silicate, however, is used in partially hydrolyzed form, so that in this case, too, storage together with zinc dust for a long period of time is not possible. These binding agents accordingly have the same disadvantages as those of German Pat. No. 12 98 221.

The binding agents of the invention, however, can be stored well together with zinc dust and/or other inorganic pigments or fillers. Such paint compositions dry after application to the substrate considerably more rapidly than known paint compositions on the basis of unhydrolyzed silicic acid esters. Furthermore, it is possible to mix the binding agent of the invention also with organic, film-forming resins and with pigments without having to make allowance for the above-described disadvantages.

The usable silicic acid esters can be either monomeric or oligomeric. The monomeric esters are derived from orthosilicic acid and can be characterized by the formula

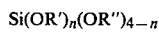

$$Si(OR')_n(OR'')_{4-n}$$

wherein n can assume values between 1 and 3, R' represents an alkyl moiety of 1 to 8 carbon atoms, preferably 2 to 4 carbon atoms, and R'' represents an alkoxyalkyl moiety of the formula $—(CH_2)_n—O—R'''$ in which n is a number between 1 and 4, preferably 2, and R''' is an alkyl moiety of 1 to 8, preferably 2 to 4 carbon atoms.

The oligomeric alkyl-alkoxyalkyl silicic acid esters have basically the same building blocks as the monomeric esters. They additionally contain oxygen bridges between the individual silicon atoms. The number of silicon atoms in the oligomeric molecule can vary in accordance with the invention between, say, 2 and 10. The $SiO_2$ content of these oligomeric silic acid esters is approximately between 18 and 40%, preferably between 24 and 39%. The ratio of the oxyalkyl groups (—O—R'— groups) to the oxyalkoxy groups (—O—R''— groups) can vary between 10:1 and 1:10.

Both the oligomeric and the monomeric silicic acid esters are present in the binding agents of the invention in unhydrolyzed form. They can be prepared by a number of methods known in themselves:

1. Transesterification of ethyl polysilicate with 40% $SiO_2$ (generally referred to as ethyl silicate) with alkylene glycol monoalkyl ethers under the action of heat and, if desired, a transesterification catalyst;
2. Transesterification of silicon tetrachloride with alkylene glycol monoalkyl ethers and alcohol;
3. Transesterification of tetramethyl silicate obtained from ferrosilicon and methanol, using a mixture of ethanol and alkylene glycol monoalkyl ethers.

In the first method, oligomeric silicic acid esters mainly are formed. Methods 2 and 3 result in the production, depending on how the reaction is conducted, of monomeric or oligomeric esters.

In order to accelerate the hardening reaction, it is desirable to add known catalysts to the silicic acid ester. Suitable as such hardening accelerators are especially amines, such as triethylamine, cyclohexylamine, triethanolamine, diethanolamine, monoethanolamine or piperidine. The amount required will amount to about 0.5 to 25% with respect to the amount of ester used. It is likewise possible to perform the hardening of the coating in an acid environment, in which anhydrous zinc chloride has proven to be an especially good catalyst.

Suitable solvents are a great number of substances which are used also in other binding agent systems. Basic criteria are their compatibility with the other components of the mixture and their rate of evaporation. The term, "compatibility," in this case, is to be understood to mean that the components of the mixture must be soluble in the solvent, but on the other hand must not enter into any reaction therewith which might result in any impairment of the reactivity of the system. The rate of evaporation of the solvents involved must be such that, after the coating has been applied to a substrate, the solvent will not evaporate before the hardening reaction has been largely completed, while on the other hand the evaporation must not be excessively slow, so that the drying of the coating will not extend beyond the technically desired short span of time. Solvents which comply with these requirements are known in themselves.

These solvents include especially alcohols, such as ethanol, propanol, isopropanol, butanol, isobutanol, cyclohexanol, ketones such as acetone, methyl ethyl ketone, methyl isobutyl ketone, cyclohexanone, ethers such as ethylene glycol monomethyl ether, ethylene glycol monoethyl ether, alkyl esters of low carboxylic acids, such as acetic acid ethyl ester, acetic acid butyl ester, acetic acid isobutyl ester, and representative of other classes of substances, such as trimethyl orthoformiate, triethyl orthoformiate, ethylene glycol monoethyl ether acetate, etc.

The binding agents of the invention are used for the preparation of coating compositions. Zinc-containing coating compositions, which are known by the name of "zinc dust paints," can be produced with such agents. However, other inorganic pigments or fillers are compatible with the binding agents of the invention, such as, for example, iron oxide, chromium oxide, titanium dioxide, barium sulfate, kaolin, talcum or mullite.

The binder of the present invention contains the silicic acid ester bearing the alkoxyalkyl group in an amount between 30 and 95 weight percent, preferably between 50 and 70 weight percent based upon the weight of the binder. The solvent is present in an amount between 0 and 65 weight percent, preferably between 20 and 45 weight percent based upon the weight of the binder. Similarly, the hardener is present in an amount between 0.1 and 15 weight percent, preferably between 2 and 10 weight percent.

When a pigment such as zinc dust is admixed with the binder it is admixed in an amount between 150 and 600 weight percent, preferably between 250 and 450 weight percent. Thus, in the finished paint composition the silicic acid ester containing the alkoxyalkyl group will be present in an amount between 4 and 40 weight percent, the solvent will be present in an amount between 0 and 25 weight percent and the hardener will be present in an amount between 0.01 and 4 weight percent. It is to be understood that the pigmentous composition can contain further materials such as fillers and resins.

In the preparation of zinc dust paints the zinc dust is preferably present in the overall paint composition in an amount between 60 and 86 weight percent, preferably between 75 and 85 weight percent.

The application characteristics of the coating compositions prepared using the present binding agent can be further improved by mixing resins with the binding agent or the ready coating composition, for it has been found that the binding agents of the invention are compatible with a great number of film-forming resins. This compatibility was not obvious, since it has hitherto only been possible to incorporate resins with sufficient compatibility into those binding agents which are prepared from hydrolyzed silicic acid esters (cf. German Pat. 12 98 221). On the other hand, binding agents on the basis of non-hydrolyzed silicic acid esters which are compatible with resins are not known.

The binding agents of the invention can be reduced not only with polyvinyl butyral but also with other types of resins dissolved in suitable solvents. Examples of such resins are linear polyesters, hydroxy polyester resins, or acrylate resins. The resin content in the finished binding agent can amount to between 1 and 20% by weight; approximately 4 to 10% by weight has proven to be a good proportion. Clear, stable solutions are obtained, whose mixtures with colored zinc dust also have a long life and can be preserved for months in closed containers as single-component paints. The paints, when applied to a substrate even in thicknesses of 100 microns and more, harden rapidly and without checking, and form an excellent protection against corrosion.

In order to more fully illustrate the nature of the invention and the manner of practicing the same the following examples are presented.

EXAMPLE 1

250 wt.-parts of ethoxyethyl-(ethyl)-silicate with the following average composition:
$Si_5O_4(OC_2H_5)_9(OCH_2CH_2OCH_2CH_3)_3$
140 wt.-parts of ethyleneglycol monoethyl ether
70 wt.-parts of isopropanol
10 wt.-parts of polymeric butyl titanate are mixed together and
30 wt.-parts of anhydrous zinc chloride are dissolved therein. Then,
250 wt.-parts of a 25% solution of NEOCRYL B-184 acrylate resin in methyl isobutyl ketone are added. Into this binding agent, 3000 weight-parts of colored zinc dust are stirred. The zinc dust has an average particle size of 7 microns and it contains admixtures of micronized mica, chromium oxide and talc in a total amount of 5% by weight.

The mixture is storable without alteration of its properties over a period of more than 6 months.

This mixture, when applied in a coating thickness of 75 microns, dries dust-free in ten minutes at a relative atmospheric humidity of 60% and a temperature of 20° C., and in 35 minutes it achieves a hardness corresponding to an HB lead pencil. After 4 hours the coat has a hardness corresponding to the No. 300 Erichsen bar.

When a steel plate coated in this manner is immersed in sea water on which crude oil is floating and through which air is bubbling, and whose temperature is 40° C., no onset of rust was observed after one month. Neither had the coating been dissolved, softened or in any other way impaired.

EXAMPLE 2

300 wt.-parts of triethyl-(ethoxyethyl)-orthosilicate $(C_2H_5O)_3(CH_3CH_2OCH_2CH_2O)Si$
110 wt.-parts of ethylene glycol monoethyl ether
50 wt.-parts of isopropanol
40 wt.-parts of triethanolamine 250 wt.-parts of a 25% solution of NEOCRYL<sup>R</sup> B-814 acrylate resin in methyl isobutyl ketone 3000 wt.-parts of colored zinc dust (per Example 1) were mixed to form a coating composition.

The mixture can be stored for more than six months without alteration of its properties. Coatings made with this mixture, and applied in a thickness of 75 microns, dry dust-free in ten minutes, are water-resistant in 25 minutes, are fully hardened (lead pencil hardness HB) in 45 minutes, and in four hours they achieve a hardness of 300 on the Erichsen test bar.

EXAMPLE 3

250 wt.-parts of ethoxyethyl (ethyl) silicate having an average composition:

$Si_5O_4(OC_2H_5)_4(OC_2H_4OC_2H_5)_8$ 140 wt.-parts of ethylene glycol monoethyl ether 60 wt.-parts of isopropanol 50 wt.-parts of triethanolamine and 250 wt.-parts of MOWITAL<sup>R</sup> B 60 HH polyvinyl butyral resin as a 15% solution in methyl isobutyl ketone were mixed together and constitute a binding agent which, when combined with 3000 wt.-parts of colored zinc dust (per Example 1) can be stored for more than 6 months without alteration of its properties.

The testing of steel plate specimens coated with this coating composition showed good strength of adhesion, rapid hardening, and very good corrosion-protection properties.

EXAMPLE 4

350 wt.-parts of ethoxyethyl-(ethyl silicate of the average composition:

$Si_5O_4(OC_2H_5)_5(OC_2H_4OC_2H_5)_7$ 120 wt.-parts of ethanol 30 wt.-parts of technical triethanolamine 250 wt.-parts of a 25% solution of DYNAPOL<sup>R</sup> H 702 saturated polyester solution in methyl isobutyl ketone, and 3000 wt.-parts of colored zinc dust (per Example 1) were mixed together as in Example 1.

The mixture can be stored for a period of more than six months without alteration of its properties.

A coat of this mixture achieves a lead pencil hardness of 2B in one hour, and of H in three hours; in 6 hours it reaches a hardness corresponding to Erichsen bar 150 E.

EXAMPLE 5

40 wt.-parts of the binder solution for Example 3

70 wt.-parts of a finely divided electrical mullite 30 wt.-parts of $TiO_2$ were mixed together to form a coating composition.

The mixture has a shelf life of more than 3 months. When applied to a suitable ground, e.g., a zinc dust primer of Example 3, it hardens relatively quickly: in 45 minutes it has a lead pencil hardness of HB, and in one day it achieves an Erichsen test bar hardness of 300.

EXAMPLE 6

100 wt.-parts of the binder solution of Example 3, 150 wt.-parts of blanc fixe N 30 wt.-parts of talc 20 wt.-parts of $TiO_2$ were mixed as in Example 1 to form a coating composition. This composition has properties analogous to those of the coating composition of Example 5.

What we claim is:

1. A binder composition for use in a pigmentous or resinous composition comprising an unhydrolyzed silicic acid ester containing an alkoxyalkyl group of the formula $$Si(OR')_n(OR'')_{4-n}$$

wherein n is any value between 1 and 3, R' represents an alkyl moiety of 1 to 8 carbon atoms, R'' represents an alkoxy alkyl moiety of the formula $-(CH_2)_n-O-R'''$ wherein n is a number between 1 and 4 and R''' is an alkyl moiety of 1 to 8 carbon atoms or an oligomeric silicic acid ester thereof having 2 to 10 silicon atoms, said binder composition containing up to 20% by weight resin.

2. A binder according to claim 1 wherein said silicic acid ester is an ester of orthosilicic acid.

3. A binder according to claim 1 wherein said silicic acid ester is an oligomeric silicic acid ester having 2 to 10 silicon atoms.

4. A binder according to claim 1 wherein the alkoxyalkyl group of the silicic acid ester is an ethoxyalkyl group whose alkyl moiety has 2 to 4 carbon atoms.

5. A binder according to claim 1 wherein the ratio of the oxyalkyl groups to the oxyalkoxy groups in the silicic acid ester is between 10:1 and 1:10.

6. A binder according to claim 1 wherein said silicic acid ester is present in an amount of 30 to 95 weight percent.

7. A binder according to claim 6 wherein said silicic acid ester is present in an amount between 50 and 70 weight percent.

8. A binder according to claim 1 wherein said binder contains a solvent which is present in an amount between 5 and 65 weight percent.

9. A binder according to claim 8 wherein said solvent is present in an amount between 20 and 45 weight percent.

10. A binder according to claim 8 wherein said binder contains a hardener which is present in an amount between 0.1 and 15 weight present.

11. A binder according to claim 10 wherein said hardener is present in an amount between 2 and 10 weight percent.

12. A binder composition according to claim 1 containing a resin.

13. A binder composition according to claim 12 wherein said resin is a linear polyester.

14. A binder according to claim 12 wherein said resin is present in said binder in an amount between 1 and 20 percent by weight.

15. A binder according to claim 14 wherein said resin is present in an amount between 4 and 10 percent by weight.

16. A composition according to claim 12 containing a pigment.

17. A composition according to claim 16 wherein said pigment is zinc dust.

18. A binder composition according to claim 12 wherein said resin is a hydroxy polyester.

19. A binder composition according to claim 12 wherein said resin is an acrylate resin.

20. A binder according to claim 1 containing resin, said binder containing said unhydrolyzed silicic acid ester or oligomeric silicic acid ester in an amount of 30 to 95 weight percent.

21. A binder according to claim 20 containing solvent in an amount of 5 to 65 weight percent.

22. A binder according to claim 2 containing hardener in an amount between 0.1 and 15 weight percent.

23. A binder according to claim 22 containing an unhydrolyzed silicic acid ester.

24. A pigmentous composition comprising a pigment and a binder said binder comprising a solvent, hardener and a silicic acid ester containing an alkoxyalkyl group.

25. A pigmentous composition according to claim 24 wherein said pigment is zinc dust.

26. A pigmentous composition according to claim 24 wherein said pigment is selected from the group consisting of zinc dust, iron oxide, chromium oxide, titanium dioxide, barium sulfate, kallin, talcum and mullite.

* * * * *

UNITED STATES PATENT AND TRADEMARK OFFICE
CERTIFICATE OF CORRECTION

PATENT NO. : 4,254,009
DATED : MARCH 3, 1981
INVENTOR(S) : WERNER DITTRICH et al

It is certified that error appears in the above-identified patent and that said Letters Patent are hereby corrected as shown below:

Claim 1, line 12, delete "up" and insert -- 1% --.
Claim 22, line 1, change "2" to -- 21 --.
Claim 24 should read as follows:

-- A pigmentous composition comprising a pigment and a binder, said pigment comprising a solvent, hardener, an unhydrolyzed silicic acid ester containing an alkoxy alkyl group of the formula $Si(OR')_n(OR'')_{4-n}$ wherein n is any value between 1 and 3, R' represents an alkyl moiety of 1 to 8 carbon atoms, R" represents an alkoxy alkyl moiety of the formula $-(CH_2)_n-O-R'''$ wherein n is a number between 1 and 4 and R''' is an alkyl moiety of 1 to 8 carbon atoms or an oligomeric silicic acid ester thereof having 2 to 10 silicon atoms, said binder composition containing 1 percent to 20 percent by weight resin. --.

Signed and Sealed this

Seventh Day of July 1981

[SEAL]

Attest:

RENE D. TEGTMEYER

Attesting Officer

Acting Commissioner of Patents and Trademarks